(12) United States Patent
Lei et al.

(10) Patent No.: US 11,313,805 B2
(45) Date of Patent: Apr. 26, 2022

(54) DIFFERENTIAL INTERFERENCE-BASED OPTICAL FILM DEFECT DETECTION METHOD

(71) Applicant: HUAIYIN NORMAL UNIVERSITY, Huaian (CN)

(72) Inventors: Feng Lei, Huaian (CN); Xintian Bian, Huaian (CN)

(73) Assignee: HUAIYIN NORMAL UNIVERSITY, Huaian (CN)

( * ) Notice: Subject to any disclaimer, the term of this patent is extended or adjusted under 35 U.S.C. 154(b) by 480 days.

(21) Appl. No.: 16/326,568

(22) PCT Filed: May 27, 2017

(86) PCT No.: PCT/CN2017/086323
§ 371 (c)(1),
(2) Date: Feb. 19, 2019

(87) PCT Pub. No.: WO2018/072447
PCT Pub. Date: Apr. 26, 2018

(65) Prior Publication Data
US 2021/0285891 A1  Sep. 16, 2021

(30) Foreign Application Priority Data
Oct. 18, 2016 (CN) .......................... 201610905495.1

(51) Int. Cl.
*G01N 21/88* (2006.01)

(52) U.S. Cl.
CPC . *G01N 21/8851* (2013.01); *G01N 2021/8887* (2013.01)

(58) Field of Classification Search
CPC ....... G01N 2021/8887; G01N 21/8851; G01N 21/88; G01N 2021/8967; G01N 21/8422; G01N 21/896
USPC ............ 356/237.1, 239.1, 450, 491; 382/141
See application file for complete search history.

(56) References Cited

U.S. PATENT DOCUMENTS

| | | | |
|---|---|---|---|
| 5,818,592 A * | 10/1998 | Womack | G01N 21/88 356/511 |
| 2003/0006549 A1 * | 1/2003 | Onishi | G01N 21/8916 271/258.01 |

* cited by examiner

*Primary Examiner* — Roy M Punnoose
(74) *Attorney, Agent, or Firm* — Houtteman Law LLC

(57) ABSTRACT

A method for detecting optical film defects based on differential interference, comprising: an incident light is adjusted into a planar light wave, and the surface of an optical film to be detected is adjusted to be perpendicular to the planar light wave; the planar light wave sequentially passes through a diaphragm, the optical film, a first collimating lens and a lenticular lens, and then form two parallel outgoing beams by differential interference; the two parallel outgoing beams pass through a second collimating lens to form a differential interference image on a photodetector; and the differential interference image is analyzed to detect both superficial and internal defects of the optical film.

6 Claims, 3 Drawing Sheets

DIFFERENTIAL INTERFERENCE-BASED OPTICAL FILM DEFECT DETECTION METHOD

TECHNICAL FIELD

The present invention relates to the field of optical film measurement, and more particularly relates to a method for detecting optical film defects based on differential interference.

BACKGROUND ART

With the rapid development of optical film manufacturing technology, its application fields have become more and more extensive. Optical films have become an indispensable raw material in industry, agriculture, medicine and other fields. In the meantime, research on miniaturized, energy saving and highly integrated high-end products has become an inevitable trend in the future development of semiconductor manufacturing technology. In order to meet such needs, higher and higher requirements are imposed on the quality of all types of functional films.

The Chinese invention patent CN104792794A disclosed a method for detecting surface defects of optical films based on machine vision, wherein the image of the surface of an optical film is smoothed by acquiring images of the surface of the optical film; then, a background image is extracted from the smoothed image of the surface of the optical film, and is subjected to binarization processing; finally, defects are identified according to the characteristics of the images of different defects. However, this method has the following drawbacks that:

(1) It is only used for detecting defects on the surface of a single-sided optical film, and fails to effectively detect bubbles and impurities inside the optical film;

(2) The detection result is susceptible to the reflective properties of the surface of an optical film, causing false detection and missed inspection, so it is impossible to fully meet the detection requirements of novel optical film production lines.

SUMMARY OF THE INVENTION

The technical problems to be solved by the present invention are that the existing methods for detecting defects of the surface of optical films are only used for detecting defects of the surface of a single-sided optical film, and fail to effectively detect defects inside optical films such as bubbles and impurities, and that the detection results are susceptible to the reflective properties of the surface of an optical film, causing false detection and missed inspection.

To solve the above-mentioned technical problems, the technical solution of the present invention is to provide a method for detecting defects of optical films based on differential interference, comprising the following steps that:

an incident light source is adjusted into a planar light wave, and the surface of an optical film to be detected is adjusted to be perpendicular to the planar light wave;

the planar light wave sequentially passes through a diaphragm, the optical film, a first collimating lens and a lenticular lens, and then form two parallel outgoing beams by differential interference;

two parallel outgoing beams pass through a second collimating lens to form a differential interference image on a photodetector;

the differential interference image is analyzed to detect both superficial and internal defects of the optical film.

The invention has the following advantages that:

(1) Differential interference is used to acquire clear images of both superficial and internal changes of the optical film, and the acquired image has a strong stereoscopic effect, making it easy to identify defects such as bubbles and irregularities;

(2) With advantages of easy implementation and low cost, the solution is suitable for being promoted and popularized in factory production lines;

(3) The solution can also detect thickness variations caused by superficial and internal defects of the optical film.

In the above-mentioned technical solution, the step of analyzing the differential interference image to detect both superficial and internal defects of the optical film is specifically as follows:

light amplitudes of the planar light wave before and after passing through the optical film are set as $U_A$ and $U_B$ respectively, the initial phase of the optical film is set as $\varphi$, wherein $\varphi$ is a constant, the phase of the superficial and internal defects of the optical film is set as $\varphi_d(x, y)$, and the phase change caused by the superficial and internal defects of the optical film is set as $\Delta_{\varphi_d}(x, y)$, and then the complex amplitude $U_1$ of the planar light wave before passing through the optical film is expressed as:

$$U_1 = U_A e^{i\varphi} \quad (1)$$

the complex amplitude $U_2$ of the planar light wave after passing through the optical film is expressed as:

$$U_2(x, y) = U_B e^{i[\varphi - \varphi_d(x, y)]} \quad (2)$$

the derivative function $U'_2(x, y)$ of the complex amplitude $U_2(x, y)$ is obtained by differential interference, and the derivative function $U'_2(x, y)$ is expressed as:

$$U'_2(x, y) = U_B e^{i[\varphi_d(x+\Delta x, y) - \varphi_d(x, y)]} = U_B e^{i\Delta\varphi_d(x, y)} \quad (3)$$

the light intensity of the differential interference image $I(x, y)$ is calculated as follows based on the derivative function $U'_2(x, y)$ of the complex amplitude $U_2(x, y)$ in equation (3):

$$I(x, y) = U'_2(x, y) \cdot U'^*_2(x, y) = 2U_B^2 + 2U_b \cos[\Delta_{\varphi_d}(x, y)] \quad (4)$$

It can be seen from the equation (4) that the phase change $\Delta_{\varphi_d}(x, y)$ can cause change in the light intensity $I(x, y)$ of the differential interference image, and therefore, the phase change $\Delta_{\varphi_d}(x, y)$ caused by the superficial and internal defects of the optical film can be inferred according to the differential interference image;

If a thickness variation caused by the superficial and internal defects of the optical film is set as $d(x, y)$, a refractive index is set as $n$, and an incident angle of the planar light wave is set as zero, then the relationship between an optical path difference $nd(x, y)$ generated after the planar light wave passes through the optical film, and the phase change $\Delta_{\varphi_d}(x, y)$ is expressed as:

$$2\pi nd(x, y)/\lambda = \Delta_{\varphi_d}(x, y) \quad (5)$$

It can be seen from equation (5) that the phase change $\Delta_{\varphi_d}(x, y)$ of the optical film is proportional to the thickness variation $d(x, y)$ of the optical film; that is, all thickness variations caused by the superficial and internal defects of the optical film are expressed as the phase changes of the optical film. Therefore, by analyzing the differential interference image, it is possible to obtain the distribution pattern of the superficial and internal defects of the optical film.

Different from traditional methods for intelligently detecting surface defects of optical films based on machine vision, the present invention detects defects such as scratches on the surface of optical films, and bubbles and irregularities inside optical films by using phase changes of planar light waves passing through optical films. The method can simultaneously detect defects such as bubbles and irregularities on both the upper and the lower surfaces of and inside optical films; in addition, the detection result is not subject to the impact of the background light of the external environment or the reflective properties of the surface of optical films.

In the above-mentioned technical solution, differential interference of the planar light wave is implemented by using a panel spectroscope.

In the above-mentioned technical solution, the photodetector is a linear array photodetector.

According to the solution, a linear array photodetector is used to improve the detection sensitivity of the photodetector.

In the above-mentioned technical solution, the sum of focal lengths of the first collimating lens and the lenticular lens is equal to the sum of focal lengths of the second collimating lens and the photodetector.

In the above-mentioned technical solution, an optical axis of the first collimating lens overlaps with an optical axis of the lenticular lens to form a first optical axis, and an optical axis of the second collimating lens overlaps with an optical axis of the photodetector to form a second optical axis. The first optical axis is perpendicular to the second optical axis, and a pedal is located in the center of the panel spectroscope.

DETAILED DESCRIPTION OF THE INVENTION

Embodiments of the present invention provide a method for detecting optical film defects based on differential interference, wherein an incident light source is adjusted into a planar light wave, and the planar light wave passes through an optical film to be detected, and carries distribution information of both the surface and the interior of the optical film to form complex light waves; a differential interference image is formed by differential interference of the complex light waves to highlight the distribution of superficial and internal defects of the optical film. The method has the advantages of clear imaging, strong stereoscopic effect, high resolution, low cost, easy implementation and convenient detection.

According to the solution, defects such as bubbles and irregularities on both the upper and the lower surfaces of and inside the optical film may be detected simultaneously, and sudden changes of the image can be obtained by differential interference, so that the defected portion of the image can become clearer; moreover, the detection result is not subject to the impact of the background light of the environment or the reflective properties of the surface of the optical film; therefore, the detection result has quite high reliability. Compared with existing method for detecting surface defects of the optical film, the present invention has the advantages of convenience, speediness and high reliability.

The present invention is described in detail below in conjunction with the drawings and specific embodiments.

Figure 1:
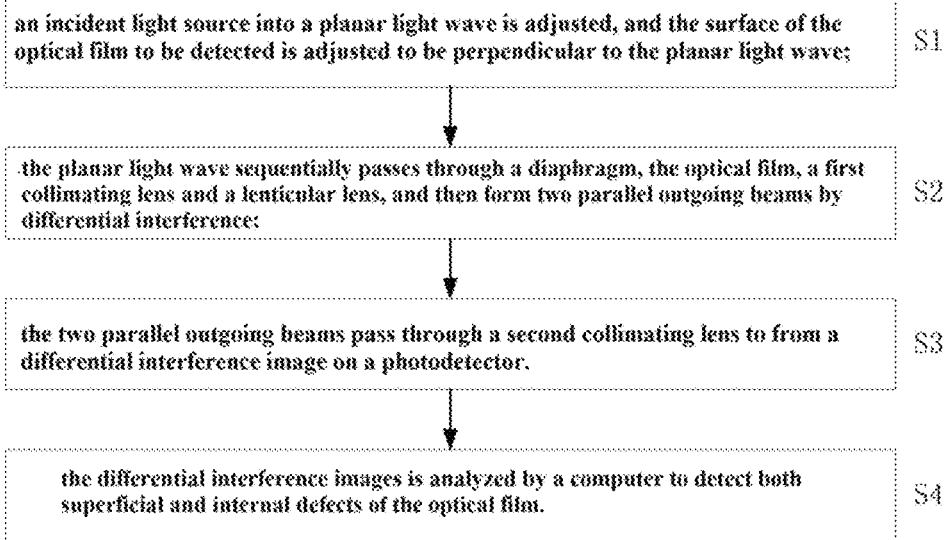
FIG. 1 is a flow schematic diagram of a method for detecting optical film defects based on differential interference provided by an embodiment of the present invention.

An embodiment of the present invention provides a method for detecting optical film defects based on differential interference, as shown in FIG. 1, comprising the following steps that:

S1. the incident light source is adjusted into a planar light wave, and the surface of the optical film to be detected is adjusted to be perpendicular to the planar light wave;

S2. the planar light wave sequentially passes through a diaphragm, the optical film, a first collimating lens and a lenticular lens, and then form two parallel outgoing beams by differential interference;

according to the present solution, differential interference of the planar light wave is implemented by using a panel spectroscope (beam splitter).

S3. the two parallel outgoing beams pass through a second collimating lens to form a differential interference image on a photodetector.

in the solution, the photodetector is a linear array photodetector to improve the detection sensitivity of the photodetector.

S4. the differential interference images is analyzed by a computer, to detect both superficial and internal defects of the optical film.

The sum of the focal lengths of the first collimating lens and the lenticular lens is equal to the sum of the focal lengths of the second collimating lens and the photodetector, and the focal lengths of the first collimating lens, the lenticular lens, the second collimating lens, and the photodetector are in the range of 35-100 mm. In the meantime, an optical axis of the first collimating lens overlaps with an optical axis of the lenticular lens to form a first optical axis, and an optical axis of the second collimating lens overlaps with an optical axis of the photodetector to form a second optical axis; the first optical axis is perpendicular to the second optical axis, and a pedal is located in the center of the panel spectroscope.

Step S4 is specifically as follows:

The light amplitudes of the planar lights wave before and after passing through the optical film are respectively set as $U_A$ and $U_B$; the initial phase of the optical film is set as $\varphi$, because the incident light wave may approximate to ideal planar light wave, the initial phase $\varphi$ may be set as a constant; the phase of the superficial and internal bubble defects of the optical film is set as $\varphi_d(x, y)$; the phase change caused by the superficial and internal defects of the film is set as $\Delta_{\varphi d}(x, y)$, then The complex amplitude $U_1$ of the planar light wave before passing through the optical film is expressed as:

$$U_1 = U_A e^{i\varphi} \qquad (1)$$

The complex amplitude $U_2$ of the planar light wave after passing through the optical film is expressed as:

$$U_2(x, y) = U_B e^{i[\varphi - \varphi_d(x, y)]} \quad (2)$$

By differential interference, the derivative function $U'_2(x, y)$ of the complex amplitude $U_2(x, y)$ is obtained, and the derivative function $U'_2(x, y)$ is expressed as:

$$U'_2(x, y) = U_B e^{i[\varphi_d(x+\Delta x, y) - \varphi_d(x, y)]} = U_B e^{i\Delta \varphi_d(x, y)} \quad (3)$$

The light intensity of the differential interference image $I(x, y)$ is calculated as follows based on the derivative function $U'_2(x, y)$ of the complex amplitude $U_2(x, y)$ in equation (3):

$$I(x, y) = U'_2(x, y) \cdot U'^*_2(x, y) = 2U_B^2 + 2U_B \cos[\Delta \varphi_d(x, y)] \quad (4)$$

It can be seen from the equation (4) that the phase change $\Delta_{\varphi_d}(x, y)$ may cause change in the light intensity $I(x, y)$ of the differential interference image, and therefore, the phase change $\Delta_{\varphi_d}(x, y)$ caused by the superficial and internal defects of the optical film can be inferred based on the differential interference image;

If a thickness variation caused by the superficial and internal defects of the optical film is set as $d(x, y)$, a refractive index is set as n, and an incident angle of the planar light wave is set as zero, then the relationship between an optical path difference $nd(x, y)$ generated after the planar light wave passes through the optical film, and the phase change $\Delta_{\varphi_d}(x, y)$ is expressed as:

$$2\pi n d(x, y)/\lambda = \Delta_{\varphi_d}(x, y) \quad (5)$$

It can be seen from equation (5) that the phase change $\Delta_{\varphi_d}(x, y)$ of the optical film is proportional to the thickness variation $d(x, y)$ of the optical film; that is, all thickness variations caused by the superficial and internal bubble defects of the optical film are expressed as the phase changes of the optical film. Therefore, by analyzing the differential interference image, it is possible to obtain the distribution pattern of the superficial and internal bubble defects of the optical film.

Figure 2:
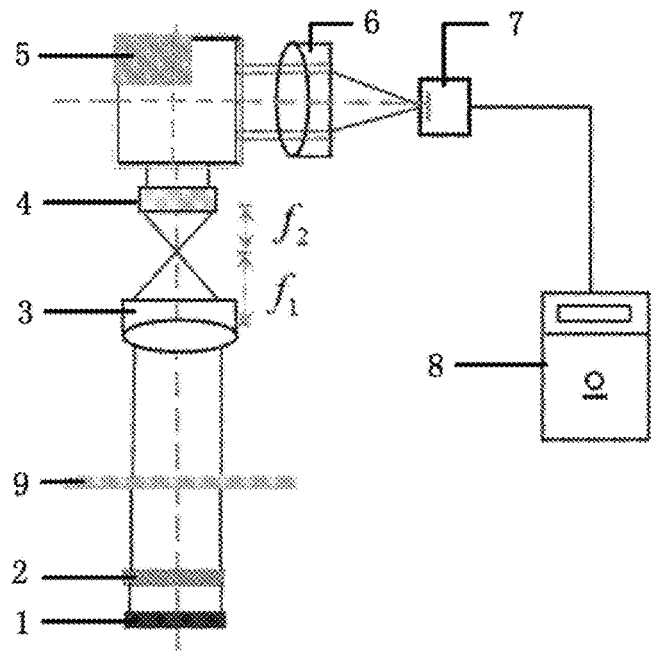
FIG. 2 is a schematic diagram of the implementation principle of the method for detecting optical film defects based on differential interference provided by an embodiment of the present invention.
Figure 3:
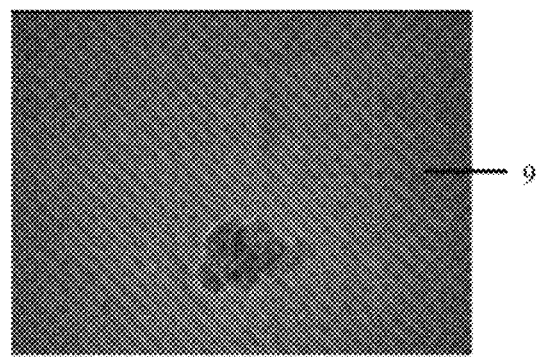
FIG. 3 is a schematic diagram of detected impurities of an optical film provided by an embodiment of the present invention.
Figure 4:
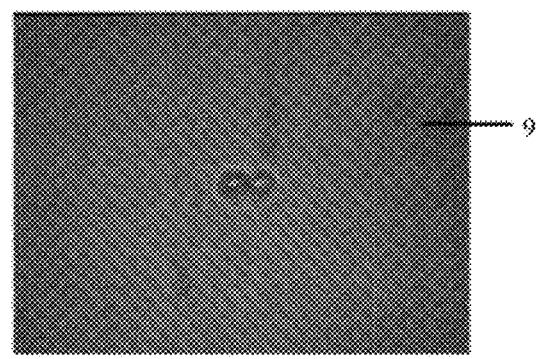
FIG. 4 is a schematic diagram of detected bubbles in an optical film provided by an embodiment of the present invention.
Figure 5:
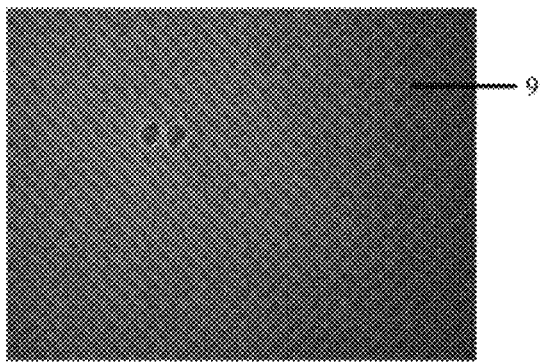
FIG. 5 is a schematic diagram of detected gray points on an optical film provided by an embodiment of the present invention.
Figure 6:
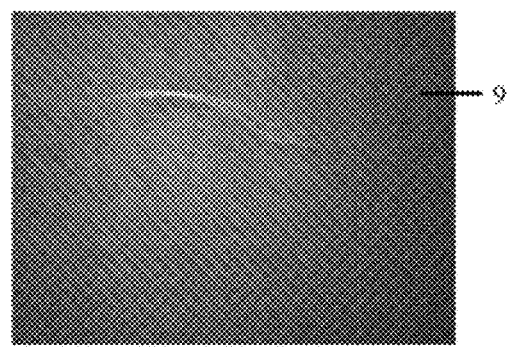
FIG. 6 is a schematic diagram of detected nail scratches on an optical film provided by an embodiment of the present invention.
Figure 7:
FIG. 7 is a schematic diagram of detected pressure wounds on an optical film provided by an embodiment of the present invention.

FIG. 2 is a schematic diagram of the implementation principle of a method for detecting optical film defects based on differential interference provided by an embodiment of the present invention, which, from the direction of an incident light source 1, includes in sequence a diaphragm 2, an optical film to be detected 9, a first collimating lens 3, a lenticular lens 4, a panel spectroscope 5, a second collimating lens 6, and a photodetector 7. The specific adjustment process is as follows: first the light beam emitted by the light source 1 is adjusted into a planar light wave, and the planar light wave vertically passes through the optical film to be detected 9, then pass through the first collimating lens 3 and the lenticular lens 4, and vertically enters the panel spectroscope 5; and the two parallel outgoing light beams are adjusted to enter the photodetector 7 after passing through the second collimating lens 6, and then the photodetector 7 is connected with the computer 8.

The light source 1 may be any continuous-wave light sources of various powers, such as a halogen light source.

FIG. 3, FIG. 4, FIG. 5, FIG. 6 and FIG. 7 are respectively the diagrams of impurities, bubbles, gray dots, nail scratches, and pressure wounds of the optical film detected by adopting the solution.

The present invention is not limited to the above-mentioned optimal embodiments, and any structural variations made by anyone inspired by the present invention and forming technical solutions the same as or similar to those of the present invention shall fall within the scope of protection of the present invention.

The invention claimed is:

1. A method for detecting optical film defects based on differential interference, comprising the steps that:
   an incident light source is adjusted into a planar light wave, and the surface of the optical film to be detected is adjusted to be perpendicular to the planar light wave;
   the planar light wave sequentially passes through a diaphragm, the optical film, a first collimating lens and the lenticular lens, and then form two parallel outgoing beams by differential interference;
   the two parallel outgoing beams pass through a second collimating lens to form a differential interference image on a photodetector;
   the differential interference images is analyzed to detect both superficial and internal defects of the optical film.

2. The method of claim 1, wherein the step of analyzing the differential interference images to detect superficial and internal defects of the optical film is specifically as follows:
   the light amplitudes of the planar waves before and after passing through the optical film that is arranged in the x/y plane, are respectively set as $U_A$ and $U_B$; the initial phase of the optical film is set as $\varphi$, wherein $\varphi$ is a constant; the phase of the superficial and internal defects of the optical film is set as $\varphi_d(x, y)$, where x,y stands for the position coordinate of the superficial and internal defects of the optical film, respectively; the phase change caused by the superficial and internal defects of the optical film is set as $\Delta \varphi_d(X, y)$, then the complex amplitude $U_1$ of the planar light wave before passing through the optical film is expressed as:

$$U_1 = U_A e^{i\varphi} \quad (1)$$

the complex amplitude $U_2$ of the planar light wave after passing through the optical film is expressed as:

$$U_2(x, y) = U_B e^{i[\varphi - \varphi_d(x, y)]} \quad (2)$$

by differential interference, the derivative function $U'_2(x, y)$ of the complex amplitude $U_2(x, y)$ is obtained, and the derivative function $U'_2(x, y)$ is expressed as:

$$U'_2(x, y) = U_B e^{i[\varphi_d(x+\Delta x, y) - \varphi_d(x, y)]} = U_B e^{i\Delta \varphi_d(x, y)} \quad (3)$$

the light intensity of the differential interference image $I(x, y)$ is calculated as follows based on the derivative function $U'_2(x, y)$ of the complex amplitude $U_2(x, y)$ in equation (3):

$$I(x, y) = U'_2(x, y) \cdot U'^*_2(x, y) = 2U_B^2 + 2U_b \cos[\Delta \varphi_d(x, y)] \quad (4)$$

it can be seen from the equation (4) that the phase change $\Delta \varphi_d(x,y)$ may cause change in the light intensity $I(x, y)$ of the differential interference image, and therefore, the phase change $\Delta \varphi_d(x, y)$ caused by the superficial and internal defects of the optical film can be inferred based on the differential interference image;

if a thickness variation caused by the superficial and internal defects of the optical film is set as $d(x, y)$, refractive index is set as n, and an incident angle of the planar light wave is set as zero, then the relationship between the optical path difference $nd(x, y)$ generated after the planar light wave passes through the optical film, and the phase change $\Delta \varphi_d(x, Y)$ is expressed as:

$$2\pi n d(x, y)/\lambda = \Delta_{\varphi_d}(x, y) \quad (5)$$

it can be seen from equation (5) that the phase change $\Delta \varphi_d(x, y)$ of the optical film is proportional to the thickness variation $d(x, y)$ of the optical film; that is, all thickness variations caused by the superficial and internal defects of the optical film are expressed as the phase changes of the optical film; therefore, by analyzing the differential interference image, it is possible to obtain the distribution pattern of the superficial and internal defects of the optical film.

3. The method of claim 1, wherein implementing differential interference of planar light waves is by using a panel spectroscope.

4. The method of claim 3, wherein an optical axis of the first collimating lens overlaps with an optical axis of the lenticular lens to form a first optical axis, and an optical axis of a second collimating lens overlaps with an optical axis of the photodetector to form a second optical axis; the first optical axis is perpendicular to the second optical axis, and a pedal is located in the center of the panel spectroscope.

5. The method of claim 1, wherein the photodetector is a linear array photodetector.

6. The method of claim 1, wherein the sum of focal lengths of the first collimating lens and the lenticular lens is equal to the sum of focal lengths of the second collimating lens and the photodetector.

* * * * *